Jan. 8, 1963  H. A. HEIDE  3,071,911
COVER REMOVING APPARATUS
Filed Sept. 14, 1959  4 Sheets-Sheet 1
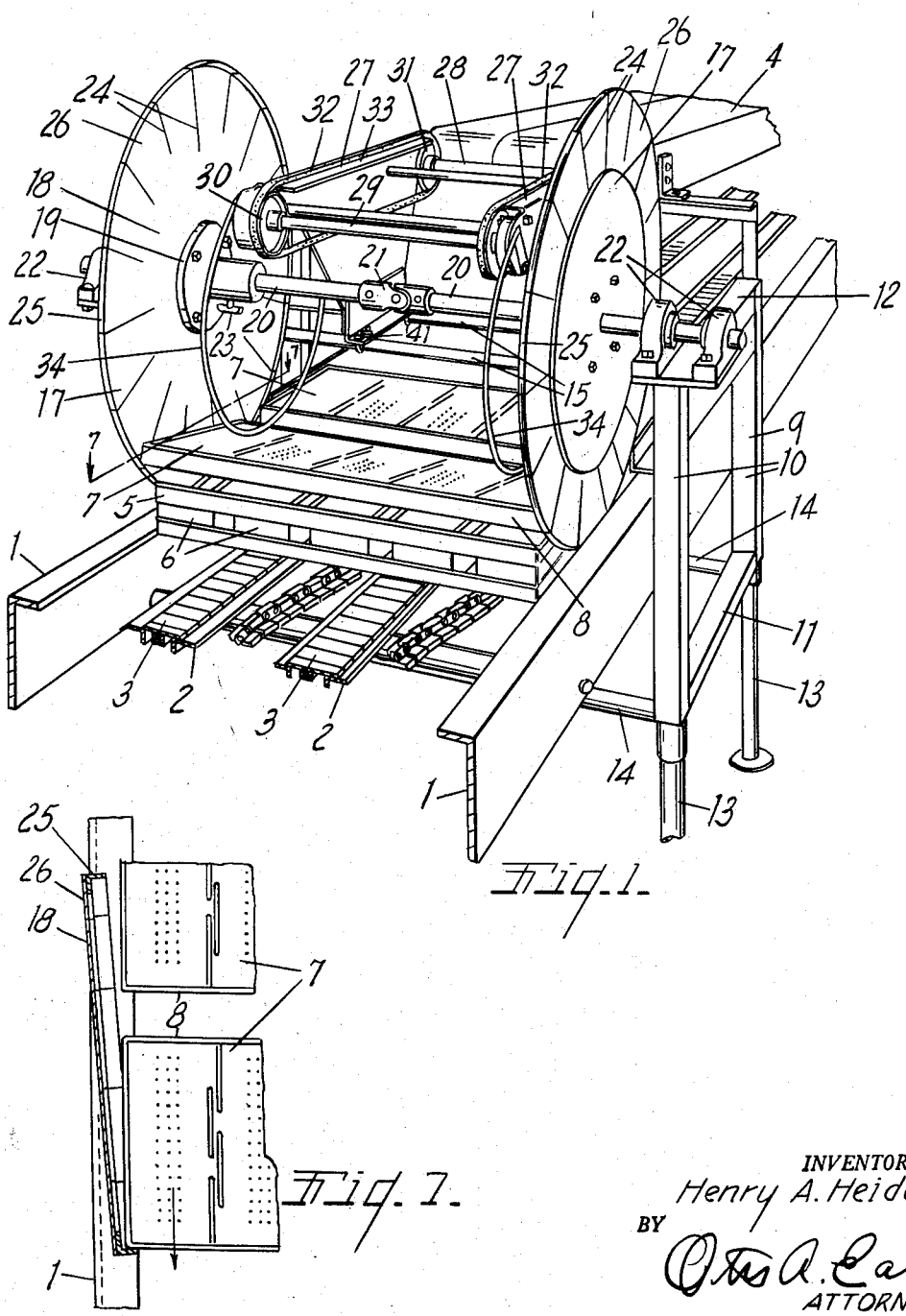
INVENTOR.
Henry A. Heide
BY
Otis A. Earl
ATTORNEY.

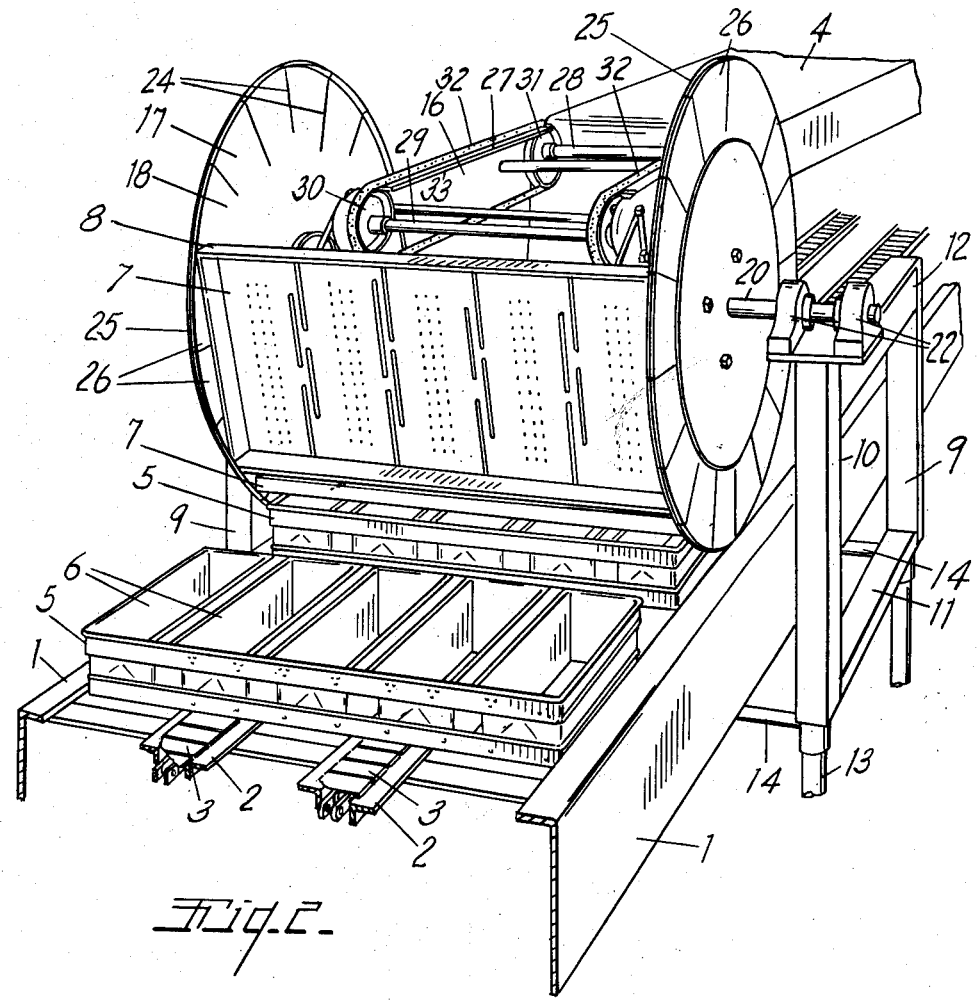
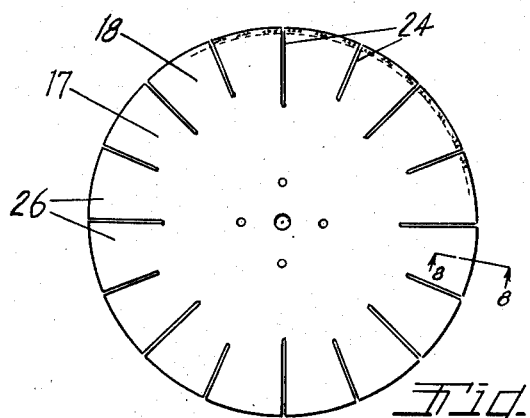
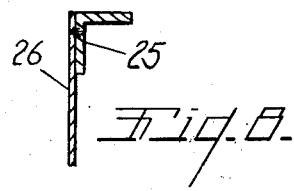

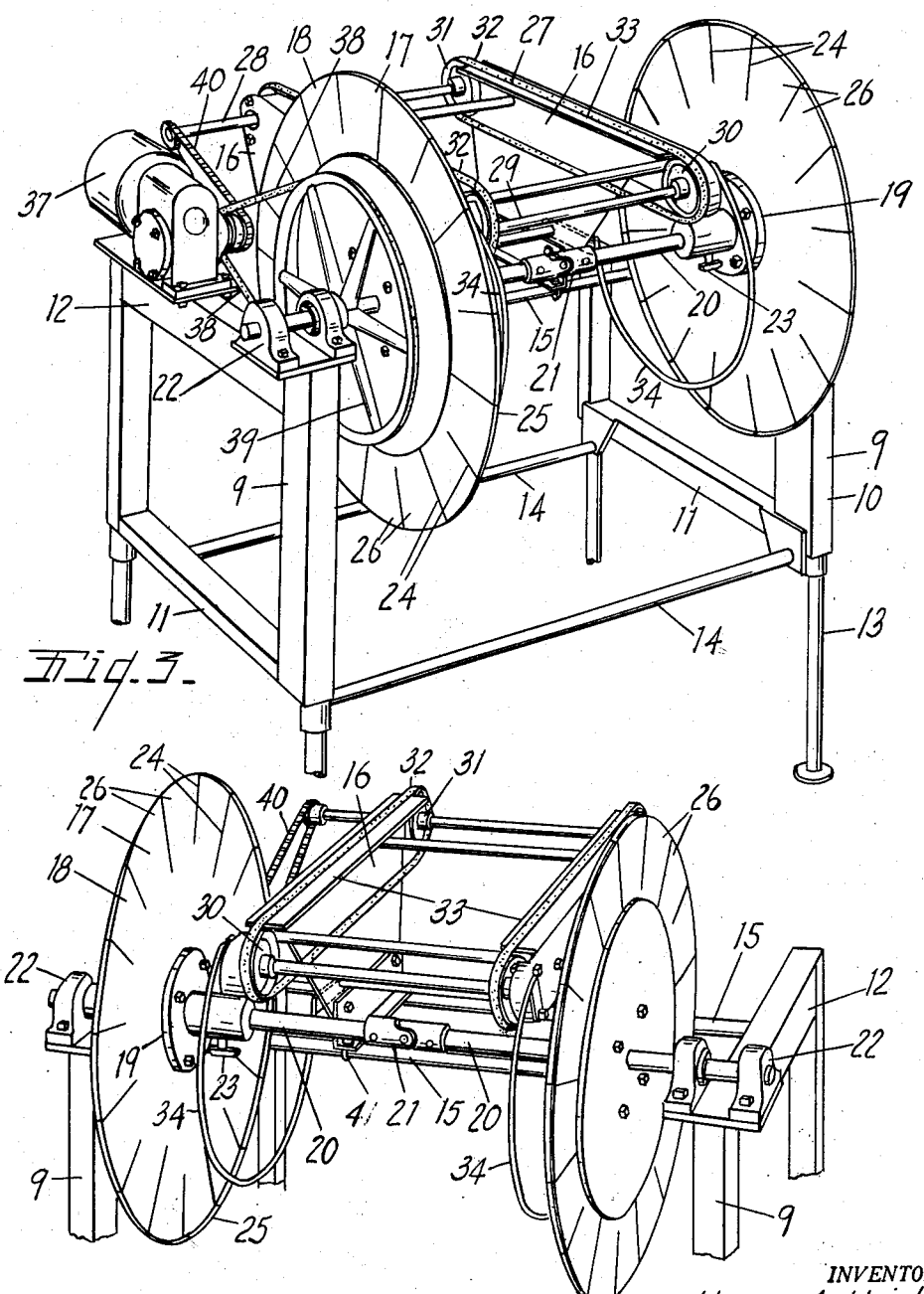

Jan. 8, 1963 H. A. HEIDE 3,071,911
COVER REMOVING APPARATUS
Filed Sept. 14, 1959 4 Sheets-Sheet 4
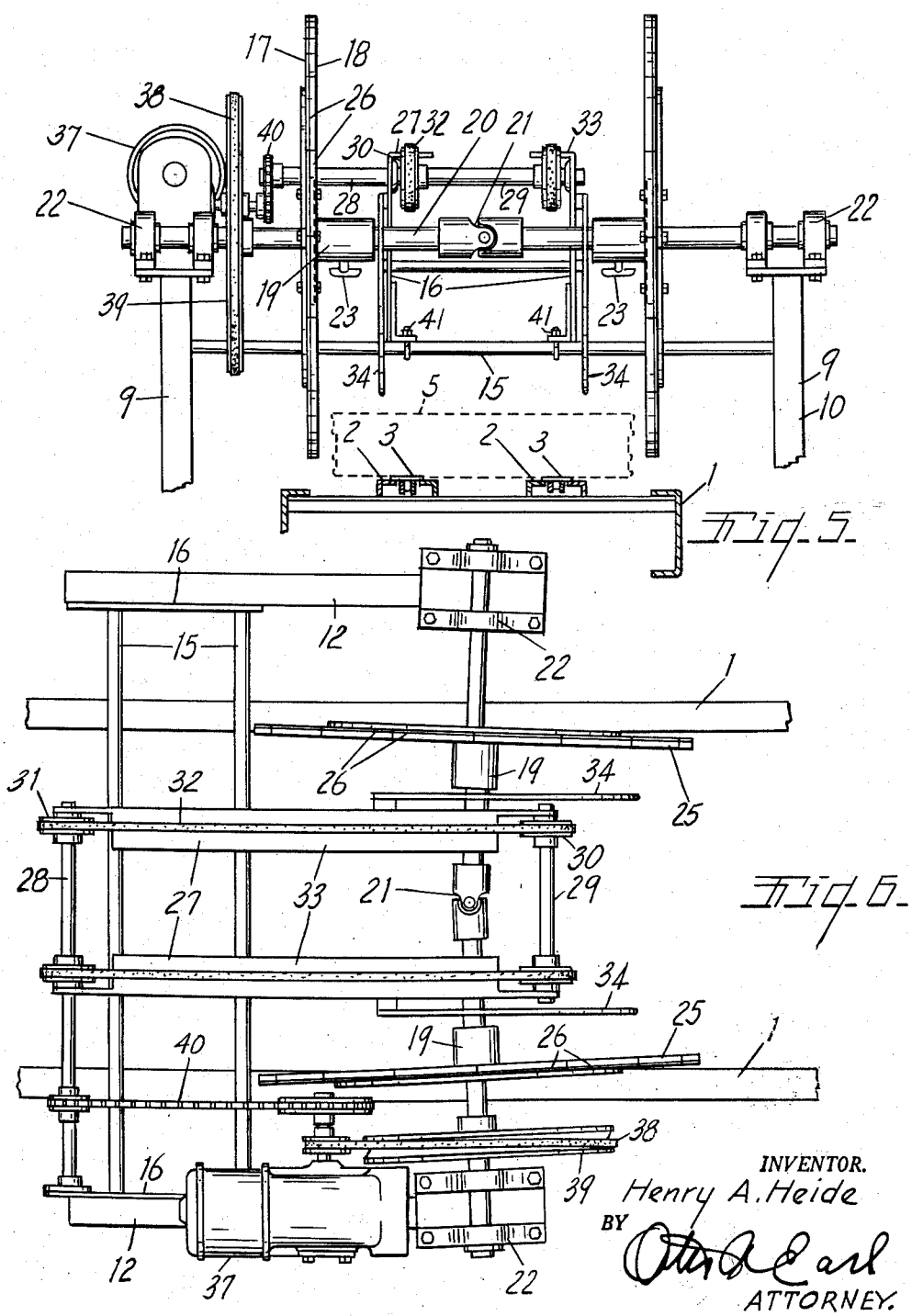

United States Patent Office 3,071,911
Patented Jan. 8, 1963

3,071,911
COVER REMOVING APPARATUS
Henry A. Heide, Addison, Ill., assignor, by mesne assignments, to Union Steel Products Company, Albion, Mich.
Filed Sept. 14, 1959, Ser. No. 839,889
16 Claims. (Cl. 53—381)

This invention relates to a machine or apparatus for removing covers from receptacles such, for example, as baking pans. The main objects of this invention are, First, to provide a cover removing machine or apparatus which is highly efficient and of large capacity and one which is entirely automatic in its operation.

Second, to provide a cover removing machine or apparatus which is capable of adjustment through a substantial range such, for example, as may be required for removing covers from baking pans of various sizes.

Third, to provide a cover removing apparatus which does not injure or abrade the pans or the covers removed therefrom.

Fourth, to provide an apparatus of the class described which is capable of being operatively associated with the type of receptacle conveyors now in general use.

Objects relating to details and economies of the invention will appear from the description to follow. The invention is defined and pointed out in the claims.

A preferred embodiment of the invention is illustrated in the accompanying drawings, in which:

FIG. 1 is a fragmentary rear perspective view of a cover removing apparatus embodying my invention, a fragment only of the pan or receptacle conveyor being illustrated and of the cover discharge conveyor, a cover being illustrated in partially lifted position.

FIG. 2 is a corresponding view with a cover completely lifted from the pan or receptacle.

FIG. 3 is a perspective view of the cover removing unit as such viewed from the side opposite that shown in FIGS. 1 and 2.

FIG. 4 is a fragmentary perspective view illustrating certain details of the cover removing means.

FIG. 5 is a vertical section.

FIG. 6 is a fragmentary plan view.

FIG. 7 is a fragmentary view in section on a line corresponding to line 7—7 of FIG. 1.

FIG. 8 is an enlarged fragmentary view on a line corresponding to line 8—8 of FIG. 9.

FIG. 9 is a plan view of one of the jaw members.

In the accompanying drawings I have illustrated an adaptation of my invention to the removing of covers from pans for baked goods. It should be understood that it is adapted for a wide variety of uses, that is, removing covers from various receptacles. In the embodiment illustrated 1 represents the side rails of a conveyor which is provided with ways 2 for the endless conveyors 3. These parts are conventionally shown as the details thereof form no part of my invention. A conveyor for the receptacles from which the covers are to be removed may, and in practice do, vary greatly in structural details.

The cover discharge conveyor 4 is also conventionally illustrated. The receptacles 5 are provided with a plurality of pans 6 as is common practice in baking pans, and the covers 7 are provided with flanges 8 which fit over the tops of the baking pans or receptacles.

The embodiment of my cover removing means illustrated comprises the frame side members designated generally by the numeral 9 and include the side uprights 10 connected by crosspieces 11 at their lower ends and crosspieces 12 at their upper ends. The legs 13 are desirably vertically adjustable, the details of adjusting means not being illustrated as they form no part of this invention. The frame side members are connected by the crosspieces 14 disposed below the pan conveyor. There is a pair of laterally spaced cross-rods 15 on which are mounted upwardly projecting plate-like brackets 16, the purpose of which will be pointed out later.

As the covered receptacles are translated along the main conveyor or receptacle conveyor, the covers are engaged by the cover gripping members designated generally by the numerals 17. These, in the embodiment illustrated, comprise the disk-like jaw members 18 which are formed of sheet metal and are provided with hubs 19 adjustably molded on the shaft sections 20 connected by the universal joint 21 and supported by bearings 22 on the frame side members 9. These shaft members 20 are disposed in an angular relation to each other, as is clearly illustrated in FIG. 6, with the result that the jaw members are at an angle to each other. The hubs 19 are adjustably secured to the shaft sections 20 by means of set screws 23 so that the members 17 may be adjusted to and from each other to adapt to covers of different dimensions.

The jaw members 18 have angular spaced series of radial slits 24 therein and have inwardly facing grippers 25 on their inner sides. The springable jaws 26 resulting from the slits 24 are substantially yieldable so that an effective engagement with the covers as the gripper members rotate is assured. The ends of the covers are engaged by the gripper members and swung upwardly as is illustrated in FIGS. 1 and 2 and deposited upon the cover discharge conveyor, designated generally by the numerals 27 and comprising the shafts 28 and 29 provided with pulleys 30 and 31 for the belts 32, the upper reaches of which are supported by flanges 33 on the upper ends of the brackets 16. The discharge conveyor delivers to the conveyor or chute 4 as the case may be.

The cover guides 34, preferably in the form of bowed rods, are provided and are positioned to engage the covers when they are engaged by the gripper members, or shortly after they are engaged, preventing the covers from springing up under the tension of the gripper member jaws. The gripper member shafts and the discharge conveyor are, in the embodiment illustrated, driven from the electric motor 37 mounted on one of the side members and connected by the belt 38 to the pulley 39 on one of the gripper member shaft sections, see FIG. 3, and by the belt or chain 40 to the shaft 28 of the discharge conveyor.

While the brackets 16 are mounted on the supporting rods 15 by means of clamps 41 so that they could be adjusted thereon, they are commonly positioned so that there is no need for adjustment thereof when the gripping members are adjusted.

The embodiment of my invention illustrated is highly practical and as stated may be operatively associated with conveyors to meet widely varying installing or use conditions. It will be appreciated that it is rare that there are two installation conditions which are exactly alike. The receptacle conveyor and the cover conveyor 4 are, as stated, conventionally shown as these form no part of this invention and they vary greatly under varying use conditions. However, I have illustrated and described a highly practical embodiment of my invention which it is believed will enable those skilled in the art to embody or adapt the same to meet various conditions and requirements.

Having thus described my invention what I claim as new and desire to secure by Letters Patent is:

1. In an apparatus for removing covers from receptacles, the combination with a conveyor for receptacles having covers thereon, of vertically adjustable frame side members disposed one on each side of said receptacle conveyor, connecting bars for said frame side members disposed below said receptacle conveyor, a cover gripper member shaft disposed above and transversely of said receptacle conveyor and comprising sections having a universal joint connection mounted on said frame side members in angular rearwardly converging relation to each other, disc like cover gripper members adjustably mounted one on each of said shaft sections, said gripper members having inwardly projecting peripheral flanges and angularly spaced radial slits therein defining an annular series of cover gripping jaws, laterally spaced cross bars mounted on said side members forwardly relatively to said gripper member shaft, brackets mounted on said cross bars to project upwardly therefrom between said gripper members, laterally spaced cover discharge conveyor shafts mounted on said brackets and provided with pulleys, the forward of said shafts being disposed between said gripper members and in a plane above that of said gripper shaft, belts on said pulleys, said cover discharge conveyor being positioned to receive the covers as they are carried rearwardly by said cover gripper members, a motor mounted on one of said frame side members, driving connections for said motor to said cover gripper shaft and to one of said discharge conveyor shafts, and curved cover guide members mounted on said bracket to project downwardly and rearwardly therefrom to constitute guides for the covers as they are grippingly engaged by said cover gripper members and lifted from the receptacles.

2. In an apparatus for removing covers from receptacles, the combination with a conveyor for receptacles having covers thereon, of vertically adjustable frame side members disposed one on each side of said receptacle conveyor, connecting bars for said frame side members disposed below said receptacle conveyor, a cover gripper member shaft disposed above and transversely of said receptacle conveyor and comprising sections having a universal joint connection mounted on said frame side members in angular rearwardly converging relation to each other, disc like cover gripper members adjustably mounted one on each of said shaft sections, said gripper members having inwardly projecting peripheral flanges and angularly spaced radial slits therein defining an annular series of cover gripping jaws, laterally spaced cross bars mounted on said side members forwardly relative to said gripper member shaft, brackets mounted on said cross bars to project upwardly therefrom between said gripper members, laterally spaced cover discharge conveyor shafts mounted on said brackets and provided with pulleys, the forward of said shafts being disposed between said gripper members and in a plane above that of said gripper shaft, belts on said pulleys, said cover discharge conveyor being positioned to receive the covers as they are carried rearwardly by said cover gripper members, means for driving said gripper shaft and said discharge conveyor, and curved cover guide members mounted on said bracket to project downwardly and rearwardly therefrom to constitute guides for the covers as they are grippingly engaged by said cover gripper members and lifted from the receptacles.

3. In an apparatus for removing covers from receptacles, the combination with a conveyor for receptacles having covers threon, of vertically adjustable frame side members disposed one on each side of said receptacle conveyor, connecting bars for said frame side members disposed below said receptacle conveyor, a cover gripper member shaft disposed above and transversely of said receptacle conveyor and comprising sections having a universal joint connection mounted on said frame side members in angular rearwardly converging relation to each other, disc like cover gripper members adjustably mounted one on each of said shaft sections, said gripper members having inwardly projecting peripheral flanges and angularly spaced radial slits therein defining an annular series of cover gripping jaws, laterally spaced cross bars mounted on said side members forwardly relative to said gripper member shaft, brackets mounted on said cross bars to project upwardly therefrom between said gripper members, laterally spaced cover discharge conveyor shafts mounted on said brackets and provided with pulleys, the forward of said shafts being disposed between said gripper members and in a plane above that of said gripper shaft, belts on said pulleys, said cover discharge conveyor being positioned to receive the covers as they are carried rearwardly by said cover gripper members, means for driving said gripper shaft and said discharge conveyor.

4. In an apparatus for removing covers from receptacles, the combination with a conveyor for receptacles having covers thereon, of vertically adjustable frame side members disposed one on each side of said receptacle conveyor, connecting bars for said frame side members disposed below said receptacle conveyor, a cover gripper member shaft disposed above and transversely of said receptacle conveyor and comprising sections having a universal joint connection mounted on said frame side members in angular rearwardly converging relation to each other, disc like cover gripper members adjustably mounted one on each of said shaft sections, said gripper members having inwardly projecting peripheral flanges and angularly spaced radial slits therein defining an annular series of cover gripping jaws, laterally spaced cross bars mounted on said side members forwardly relative to said gripper member shaft, brackets mounted on said cross bars to project upwardly therefrom between said gripper members, laterally spaced cover discharge conveyor shafts mounted on said brackets and provided with pulleys, the forward of said shafts being disposed between said gripper members and in a plane above that of said gripper shaft, belts on said pulleys, said brackets being provided with supporting ways for the upper reaches of said belts, the lower reaches of said belt being disposed on the inner sides of said brackets, said cover discharge conveyor being positioned to receive the covers as they are carried rearwardly by said cover gripper members, means for driving said gripper shaft and said discharge conveyor.

5. In an apparatus for removing covers from receptacles, the combination with a conveyor for receptacles having covers thereon, of a frame including side members disposed one on each side of said receptacle conveyor, a cover gripper member shaft disposed above and transversely of said receptacle conveyor and comprising sections and mounted on said frame side members, disc-like cover gripper members mounted one on each of said shaft sections, said gripper members having inwardly projecting peripheral flanges and angularly spaced radial slits therein defining an annular series of cover gripping jaws, laterally spaced cover discharge conveyor shafts mounted on said frame and provided with pulleys, one of said shafts being disposed between said gripper members and in a plane above that of said gripper shaft, belts on said pulleys, said cover discharge conveyor being positioned to receive the covers as they are carried rearwardly by said cover gripper members, means for driving said gripper shaft and said discharge cover conveyor, and curved cover guide members mounted on said bracket to project downwardly and rearwardly therefrom to constitute guides for the covers as they are grippingly engaged by said cover gripper members and lifted from the receptacles.

6. In an apparatus for removing covers from receptacles, the combination with a conveyor for receptacles having covers thereon, of a frame including side members disposed one on each side of said receptacle conveyor, a cover gripper member shaft disposed above and transversely of said receptacle conveyor and comprising angularly disposed sections and mounted on said frame side members, disc-like cover gripper members mounted one on each of said shaft sections, said gripper members having inwardly projecting peripheral flanges and angularly spaced radial slits therein defining an annular series of cover gripping jaws, laterally spaced cover discharge conveyor shafts mounted on said frame and provided with pulleys, one of said shafts being disposed between said gripper members and in a plane above that of said gripper shaft, belts on said pulleys, said cover discharge conveyor being positioned to receive the covers as they are carried rearwardly by said cover gripper members, means for driving said gripper shaft and said discharge cover conveyor.

7. In an apparatus for removing covers from receptacles, the combination with a receptacle conveyor, a cover conveyor disposed in vertically spaced relation above said receptacle conveyor to convey covers in opposite direction from that of the receptacles on said receptacle conveyor, rotatably mounted disc-like gripper members disposed in angular relation to each other, said gripper members having inwardly projecting peripheral flanges and angularly spaced radial slits therein defining an annular series of cover gripping jaws, said cover discharge conveyor being disposed with the forward end thereof between said gripper members to receive the covers discharged therefrom and cover guide members positioned to guide the covers as they are grippingly engaged by said cover gripper members.

8. In an apparatus for removing covers from receptacles, the combination with a receptacle conveyor, a cover conveyor disposed in vertically spaced relation above said receptacle conveyor to convey covers in opposite direction from that of the receptacles on said receptacle conveyor, rotatably mounted disc-like gripper members disposed in angular relation to each other, said gripper members having inwardly projecting peripheral flanges and angularly spaced radial slits therein defining an annular series of cover gripping jaws, said cover discharge conveyor being disposed with the forward end thereof between said gripper members to receive the covers discharged therefrom.

9. An apparatus for removing covers from receptacles comprising a receptacle conveyor, a cover discharge conveyor disposed in a vertically spaced relation to said receptacle conveyor, rotatably mounted gripper members, each having an annular series of springably yieldable cover gripping jaws, said gripper members being disposed in diverging relation to grip covers of receptacles conveyed by said receptacle conveyor between them, the angular relation of said grippers to each other being such that the covers are released therefrom upon said cover discharge conveyor, and cover guide members positioned to guidingly engage the covers as they are initially engaged by said cover gripper members.

10. An apparatus for removing covers from receptacles comprising a receptacle conveyor, a cover discharge conveyor disposed in vertically spaced relation to said receptacle conveyor, rotatably mounted gripper members, each having an annular series of springably yieldable cover gripping jaws, said gripper members being disposed in diverging relation to grip covers of receptacles conveyed by said receptacle conveyor between them, the angular relation of said grippers to each other being such that the covers are released therefrom upon said cover discharge conveyor.

11. An apparatus for removing covers from receptacles comprising a conveyor for covered receptacles, rotatably driven cover gripper members provided with an annular series of cover gripping jaws, a cover discharge conveyor disposed with one end between said gripper members, said gripper members being disposed in angular relation to each other to grippingly engage covers of receptacles translated on said receptacle conveyor and to release them upon said discharge conveyor, and a cover guide member disposed between said cover gripper members in spaced relation to the cover engaging jaws thereof.

12. An apparatus for removing covers from receptacles, the covers being dimensioned so that opposed edges thereof project from the receptacles, comprising a conveyor for the receptacles, laterally spaced rotatably driven cover gripper members disposed with their axes in angular relation to each other and vertically spaced relative to the path of the travel of the receptacles on the receptacle conveyor, said cover gripper members each comprising an annular series of springable cover gripper jaws having inwardly projecting grippers disposed in annular series relation, and a cover discharge disposed with its receiving end projecting between said gripper members and in vertically spaced relation to the initial cover engaging position of the jaws, said gripper members acting to grip the covers while being translated on the receptacles lift them from the receptacles and discharge them upon said cover discharge.

13. An apparatus for removing covers from receptacles, the covers having substantially parallel opposite ends and being dimensioned relative to the receptacles so that such opposite ends project laterally from the receptacles, a conveyor for the receptacles and on which the receptacles are arranged with their projecting edges parallel with the path of travel of the receptacles, laterally spaced rotatably driven disk-like cover gripper members disposed with their axes in angular relation to each other and so that the gripper members are outwardly inclined relative to each other, the gripper members having inwardly projecting peripheral flanges and angularly spaced radial slits therein defining an annular series of independently springable jaws of a width substantially less than the width of the covers so that the covers are gripped at each end thereof by angularly spaced jaws of the gripper members, and a cover discharge disposed with its receiving end projecting between the gripper members in vertically spaced relation to and substantially above the cover engaging position of the jaws, said gripper members acting to grip the covers while being translated on the receptacles and lift them from the receptacles and discharge them upon said cover discharge.

14. An apparatus for removing covers from receptacles, the covers having substantially parallel opposite ends and being dimensioned relative to the receptacles so that such opposite ends project laterally from the receptacles, a conveyor for the receptacles and on which the receptacles are arranged with their projecting edges parallel with the path of travel of the receptacles, laterally spaced rotatably driven disk-like cover gripper members disposed so that the gripper members are outwardly inclined relative to each other, the gripper members having inwardly projecting peripheral flanges and angularly spaced radial slits there in in defining an annular series of independently springable jaws of a width substantially less than the width of the covers so that the covers are gripped at each end thereof by angularly spaced jaws of the gripper members, said gripper members acting to grip the covers while being translated on the receptacles and lift them from the receptacles.

15. An apparatus for removing covers from receptacles, a conveyor for the receptacles, laterally spaced rotatably driven disk-like cover gripper members disposed with their axes in angular relation to each other and so that the gripper members are outwardly inclined relative to each other, the gripper members having inwardly projecting peripheral flanges and angularly spaced radial slits therein defining an annular series of independently springable jaws of a width substantially less than the width of the covers so that the covers are gripped by a plurality of jaws of the gripper members, and a cover discharge conveyor disposed with its receiving end projecting between the gripper members in vertically spaced relation to and substantially above the cover engaging position of the jaws, said gripper members acting to grip the covers while being translated on the receptacles, lift them from the receptacles and discharge them upon said discharge conveyor.

16. An apparatus for removing covers from receptacles, a conveyor for the receptacles, laterally spaced rotatably driven disk-like cover gripper members disposed with their axes in angular relation to each other and so that the gripper members are outwardly inclined relative to each other, the gripper members having inwardly projecting peripheral flanges and angularly spaced radial slits therein defining an annular series of independently springable jaws of a width substantially less than the width of the covers so that the covers are gripped by a plurality of jaws of the gripper members.

References Cited in the file of this patent

UNITED STATES PATENTS

| | | |
|---|---|---|
| 2,593,627 | Stover | Apr. 22, 1952 |
| 2,683,560 | Keller | July 13, 1954 |
| 2,778,180 | Eyster | Jan. 22, 1957 |
| 2,866,305 | Ullman et al. | Dec. 30, 1958 |